(12) United States Patent
Ryu et al.

(10) Patent No.: US 10,057,869 B2
(45) Date of Patent: Aug. 21, 2018

(54) NETWORK SYNCHRONIZATION APPARATUS AND METHOD OF TIME DIVISION MULTIPLE ACCESS (TDMA)-BASED MESH NETWORK SATELLITE COMMUNICATION SYSTEM

(71) Applicant: Electronics and Telecommunications Research Institute, Daejeon (KR)

(72) Inventors: Joon Gyu Ryu, Daejeon (KR); Soo Yeob Jung, Daejeon (KR); Deock Gil Oh, Daejeon (KR); Jonggyu Oh, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 15/815,259

(22) Filed: Nov. 16, 2017

(65) Prior Publication Data
US 2018/0139711 A1  May 17, 2018

(30) Foreign Application Priority Data

Nov. 17, 2016 (KR) .......................... 10-2016-0153429
Mar. 21, 2017 (KR) .......................... 10-2017-0035471

(51) Int. Cl.
*H04B 7/19* (2006.01)
*H04W 56/00* (2009.01)
*H04W 84/06* (2009.01)

(52) U.S. Cl.
CPC .......... *H04W 56/004* (2013.01); *H04W 84/06* (2013.01)

(58) Field of Classification Search
CPC ........................... H04W 56/004; H04W 84/06
See application file for complete search history.

(56) References Cited

U.S. PATENT DOCUMENTS

| 6,633,621 | B1 * | 10/2003 | Bishop ..................... G04G 7/00 375/375 |
| 7,881,663 | B2 | 2/2011 | Jo et al. |
| 8,675,634 | B2 | 3/2014 | Agarwal |
| 8,897,206 | B2 | 11/2014 | Bhaskar et al. |
| 9,166,675 | B2 | 10/2015 | Bhaskar et al. |
| 9,310,832 | B2 * | 4/2016 | Frels ......................... G06F 1/12 |
| 2003/0122711 | A1 * | 7/2003 | Panasik ................ G01C 21/206 342/387 |
| 2004/0062335 | A1 * | 4/2004 | Sachse ................ H04L 27/2659 375/376 |
| 2006/0271677 | A1 * | 11/2006 | Mercier ............ G06F 17/30197 709/224 |
| 2008/0291758 | A1 * | 11/2008 | Chu ..................... G11C 7/1051 365/194 |
| 2009/0225662 | A1 * | 9/2009 | Tsai ..................... H04B 7/2675 370/242 |

(Continued)

*Primary Examiner* — Dominic Rego
(74) *Attorney, Agent, or Firm* — William Park & Associates Ltd.

(57) ABSTRACT

Disclosed is a network synchronization apparatus and method of a time division multiple access (TDMA)-based mesh network satellite communication system, the network synchronization method of a terminal in a satellite communication system including receiving timing error information from a central station, generating a mesh superframe start time (SST') by reversing a sign of the timing error information, and receiving traffic information transmitted by a transmission terminal using the mesh SST'.

8 Claims, 3 Drawing Sheets

(56) References Cited

U.S. PATENT DOCUMENTS

| | | | |
|---|---|---|---|
| 2012/0099521 A1 | 4/2012 | Ryu et al. | |
| 2012/0150529 A1* | 6/2012 | Kim | G06F 17/2809 |
| | | | 704/2 |
| 2012/0218419 A1* | 8/2012 | Massey | H04B 17/21 |
| | | | 348/180 |
| 2013/0293709 A1* | 11/2013 | Cha, II | H04N 9/79 |
| | | | 348/143 |
| 2015/0081201 A1* | 3/2015 | Rubin | G08G 9/02 |
| | | | 701/301 |
| 2016/0308663 A1* | 10/2016 | Song | H04J 3/0697 |
| 2017/0090464 A1* | 3/2017 | Horiguchi | G05B 19/4141 |
| 2017/0118731 A1* | 4/2017 | Lee | H04L 43/0864 |

* cited by examiner

NETWORK SYNCHRONIZATION APPARATUS AND METHOD OF TIME DIVISION MULTIPLE ACCESS (TDMA)-BASED MESH NETWORK SATELLITE COMMUNICATION SYSTEM

CROSS-REFERENCE TO RELATED APPLICATION(S)

This application claims the priority benefit of Korean Patent Application No. 10-2016-0153429 filed on Nov. 17, 2016, and Korean Patent Application No. 10-2017-0035471, filed on Mar. 21, 2017, in the Korean Intellectual Property Office, the disclosure of which is incorporated herein by reference for all purposes.

BACKGROUND

1. Field

One or more example embodiments relate to an apparatus and method of controlling a network synchronization between terminals in a time division multiple access (TDMA)-based mesh network satellite communication system.

2. Description of Related Art

A satellite communication network may include a satellite body, a central station, and a plurality of terminals, and provide various multimedia services such as a voice, an image, data, and the like to a user. The satellite communication network may include a mesh network for direct communication between terminals and a star network for communication between the central station and the terminal.

Here, the satellite communication network may have a star network structure in which each of terminals included in a satellite communication system is timing synchronized and Freq. synchronized with a central station in order to operate the mesh network in the satellite communication network. Also, the central station corrects a delay error between a satellite and each of terminals. Accordingly, a terminal performing a mesh network communication should be placed within a distance included in an error range, that is, a range in which a delay error is correctable by the central station.

Thus, a method of providing a network synchronization between terminals without limitation on a distance in a time division multiple access (TDMA)-based mesh network satellite communication system, is requested.

SUMMARY

An aspect provides an apparatus and method of providing a network synchronization between terminals in a time division multiple access (TDMA)-based mesh network satellite communication system.

According to an aspect, there is provided a synchronization method of a mesh network satellite communication system including receiving timing error information from a central station, generating a mesh superframe start time (SST') by reversing a sign of the timing error information, and receiving traffic information transmitted by a transmission terminal using the mesh SST'.

The method may further include receiving forward link signaling (FLS) information and transmission delay information from the central station, generating an SST based on configuration information on each of bursts, a frame, and a superframe included in the received FLS information, and transmitting a log-on burst (LB) signal to the central station in a transmission time determined based on the SST and the transmission delay information, wherein the timing error information is calculated using the LB signal in the central station.

The generating of the mesh SST' may include generating the mesh SST' by adding a transmission delay difference included in the timing error information to an SST.

The traffic information may be transmitted from the transmission terminal in a transmission time determined based on an SST and the timing error information received from the central station by the transmission terminal.

According to another aspect, there is provided a mesh network satellite communication system including a terminal B configured to receive timing error information from a central station, generate a mesh superframe start time (SST') by reversing a sign of the timing error information, and receive traffic information transmitted by a transmission terminal using the mesh SST'.

The terminal B may be configured to receive forward link signaling (FLS) information and transmission delay information from the central station, generate an SST based on configuration information on each of bursts, a frame, and a superframe included in the received FLS information, and transmit a log-on burst (LB) signal to the central station in a transmission time determined based on the SST and the transmission delay information, and the timing error information is calculated using the LB signal in the central station.

The terminal B may be configured to generate the mesh SST' by adding a transmission delay difference of the terminal B included in the timing error information to an SST.

The traffic information may be transmitted from the transmission terminal in a transmission time determined based on an SST and the timing error information received from the central station by the transmission terminal.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, some example embodiments will be described in detail with reference to the accompanying drawings. A network synchronization method of a time division multiple access (TDMA)-based mesh network satellite communication system according to an example embodiment may be performed by a network synchronization apparatus, for example, a terminal A or a terminal B, of the TDMA-based mesh network satellite communication system.

Figure 1:
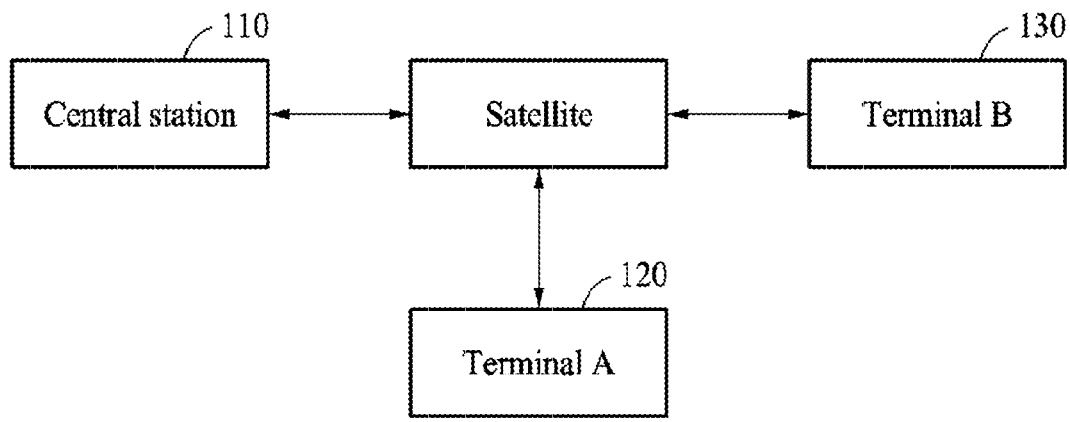
FIG. 1 is a block diagram illustrating a time division multiple access (TDMA)-based mesh network satellite communication system according to an example embodiment.

FIG. 1 is a block diagram illustrating a time division multiple access (TDMA)-based mesh network satellite communication system according to an example embodiment.

As illustrated in FIG. 1, the TDMA-based mesh network satellite communication system includes a central station 110, a terminal A 120, and a terminal B 130.

The central station 110 includes a system controlling function for managing network resource and controlling a TDMA mesh network connection between the central station 110, the terminal A 120, and the terminal B 130.

The terminal A 120 may transmit, to the central station 110, a message requesting the TDMA mesh network connection between the terminal A 120 and the terminal B 130. Here, the central station 110 may transmit the received message to the terminal B 130, receive a response to the message from the terminal B 130, and transmit the response to the terminal A 120. In addition, when the response to the message is associated with a connection acceptance, the central station 110 may transmit traffic burst time plan (TBTP) information to the terminal A 120. The terminal A 120 may be connected to a TDMA mesh network between the terminal A 120 and the terminal B 130 based on the received TBTP information.

The terminal B 130 may receive a message requesting the TDMA mesh network connection between the terminal A 120 and the terminal B 130 from the central station 110. The terminal B 130 may transmit the response to the received message to the central station 110.

Also, the terminal B 130 may receive timing error information from the central station 110, generate a mesh superframe start time (SST') by reversing a sign of timing error information, and receive traffic information transmitted by a transmission terminal using the mesh SST'.

The terminal B 130 may perform communication with the terminal A 130 in response to a request made by the terminal A 120, and include a function identical to that of the terminal A 120. That is, the terminal B 130 is identical to the terminal A 120. The terminal A 120 and the terminal B may be distinguished by whether a terminal user is a transmitter or a receiver.

The TDMA-based mesh network satellite communication system may provide a network synchronization between terminals without an auxiliary device, for example, a global positioning system (GPS), in response to the terminal B 130 generates the mesh SST' by reversing the sign of timing error information and receives the traffic information transmitted by the transmission terminal 120 using the mesh SST'.

Figure 2:
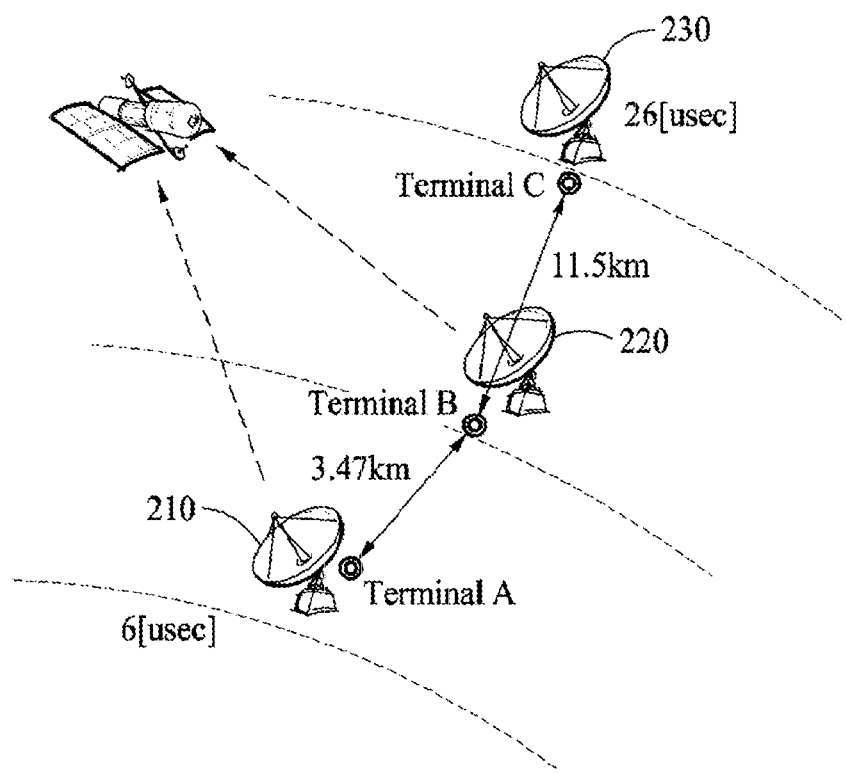
FIG. 2 illustrates a communication between terminals in a time division multiple access (TDMA)-based mesh network satellite communication system according to the related art.

FIG. 2 illustrates a communication between terminals in a time division multiple access (TDMA)-based mesh network satellite communication system according to the related art.

A digital video broadcasting-return channel by satellite 2 (DVB-RCS2) TRF burst guard time may be associated with K symbols regardless of a sender report (SR). Also, when terminals operate at 1 Msps, a mesh network connection between terminals within a range of 10 usec may be possible. In addition, a service coverage in which the mesh network communication is possible may be broadened by decreasing a symbol rate. For example, when the SR corresponds to 0.5 Msps, the mesh network communication between terminals within a range of 20 usec is possible.

In FIG. 2, when a communication between the terminal A 210 and the terminal B 220 is performed in FIG. 2, a path difference between the terminal A 210 and the terminal B 220 may correspond to 6 [usec]. Thus, when transmission is performed at 1 Msps, the path difference between the terminal A 210 and the terminal B 220 may correspond to 6 usec which is less than or equal to 10 usec, that is, a guard time.

However, when a communication between the terminal B 220 and a terminal C 230 is performed, a path difference between the terminal B 220 and the terminal C 230 may correspond to 26 [usec]. Thus, 26 usec corresponding to the path difference between the terminal B 220 and the terminal C 230 may be less than or equal to the guard time.

That is, when the service is provided at 1 Msps, the mesh network connection may be possible within the 10 [usec] of guard time when a distance between a terminal and a ground is within 3.47 kilometers, and the mesh network connection may be possible within the 20 [usec] of guard time when the distance between the terminal and the ground is within 11.5 kilometers.

However, a transmission efficiency may deteriorate when the guard time is extended for the mesh network connection between terminals distanced more than 100 kilometers from each other.

Figure 3:
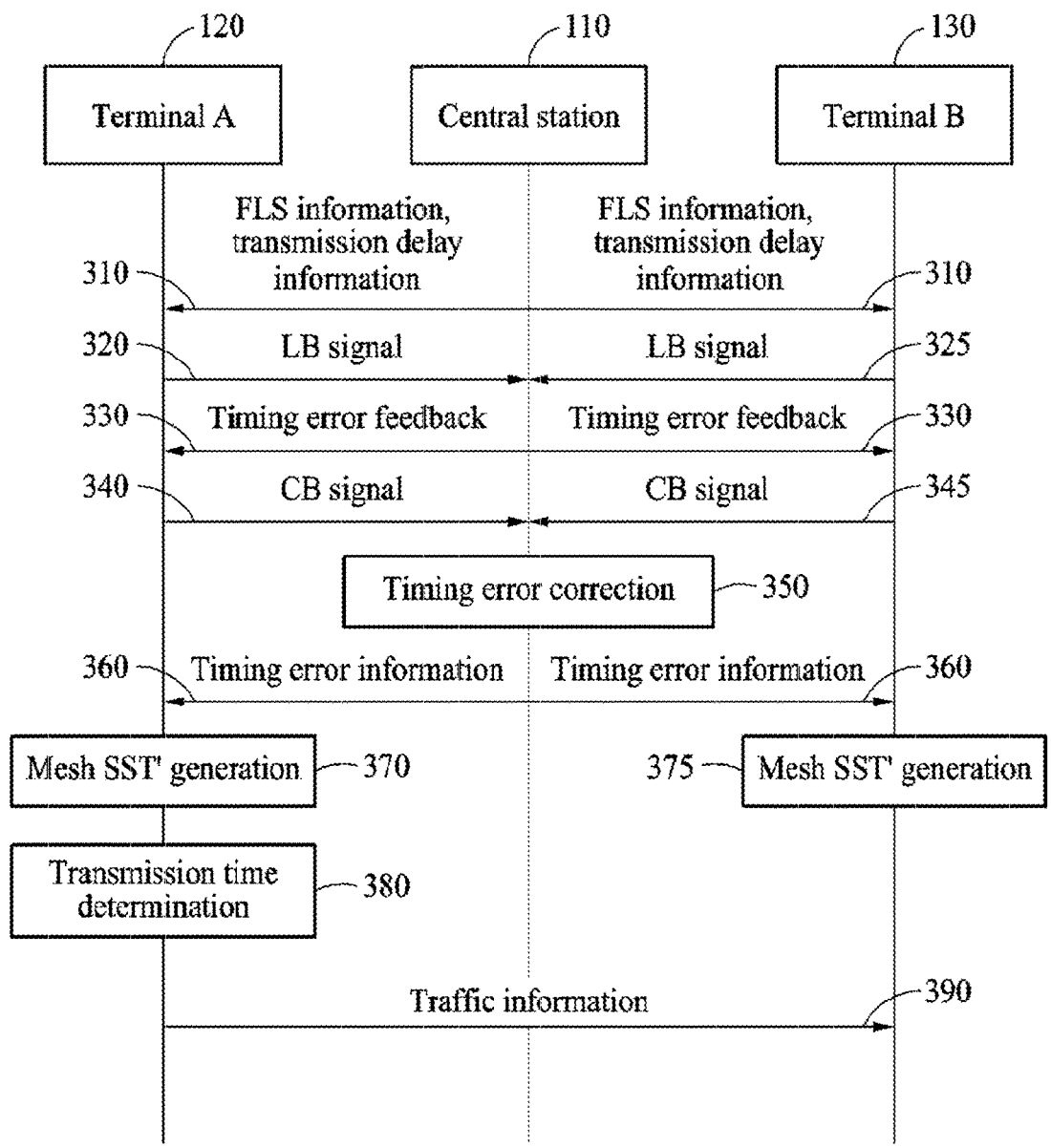
FIG. 3 illustrates a network synchronization method of a time division multiple access (TDMA)-based mesh network satellite communication system according to an example embodiment.

FIG. 3 illustrates a network synchronization method of a time division multiple access (TDMA)-based mesh network satellite communication system according to an example embodiment.

In operation 310, the central station 110 transmits forward link signaling (FLS) information to each of the terminal A 120 and the terminal B 130 to perform mesh communication. The central station 110 may generate a network clock reference (NCR) counter value using a stable internal clock, for example, a global positioning system (GPS), and generate a periodic superframe start time (SST) based on the NCR counter value. Here, the SST is an NCR counter value. That is, the central station 110 may provide information including a superframe, a frame, and bursts based on the NCR counter value and transmit the information to a terminal through the FLS information.

Also, the terminal A 120 and the terminal B 130 may restore a clock to be synchronized with the central station 110 by performing an NCR recovery using data received from the central station 110 and perform a terminal internal NCR counter corresponding to the clock.

In operation 320, the terminal A 120 identifies configuration information on each of bursts, a frame, a superframe, and an SST included in the FLS information received in operation 310, and the terminal A 120 transmits a log-on burst (LB) signal to the central station 110 in a transmission time determined based on the SST and transmission delay information.

In operation 325, the terminal B 130 identifies the configuration information on each of the bursts, the frame, the superframe, and the SST included in the FLS information received in operation 310, and the terminal B 130 transmits the LB signal to the central station 110 in the transmission time determined based on the SST and the transmission delay information.

In operation 330, the central station 110 estimates a timing error by decoding the LB signal received in operations 320 and 325. The central station 110 may feed the estimated timing error back to each of the terminal A 120 and the terminal B 130.

In operation 340, a state of the terminal A 120 may be converted into a state of a coarse sync based on the timing error fed back in operation 330, and the terminal A transmits a control burst (CB) signal to the central station 110.

In operation 345, a state of the terminal B 130 may be converted into a state of a coarse sync based on the timing error fed back in operation 330, and the terminal B 130 transmits the CB signal to the central station 110.

In operation 350, the central station 110 generates the timing error information by correcting the timing error estimated in operation 330 using the CB signals received in operations 340 and 345.

In operation 360, the central station 110 transmits the timing error information generated in operation 350 to each of the terminal A 120 and the terminal B 130.

In operation 370, the terminal A 120 generates an SST' for mesh communication (terminal-to-terminal TDMA communication) by reversing a sign of the timing error information received in operation 360. Here, the terminal A 120 may generate the mesh SST' by adding a transmission delay difference of the terminal A 120 included in the timing error information to the SST.

In operation 375, the terminal B 130 generates the SST' for mesh communication (terminal-to-terminal TDMA communication) by reversing the sign of the timing error information received in operation 360. Here, the terminal B 130 may generate the mesh SST' by adding the transmission delay difference of the terminal B 130 included in the timing error information to the SST.

In operation 380, the terminal A 120 determines a transmission time to transmit the traffic information determined based on the SST and the timing error information received in operation 360 to the terminal B 130.

In operation 390, the terminal A 120 transmits the traffic information to the terminal B 130 in the transmission time determined in operation 380. Here, the terminal B 130 may receive the traffic information based on the mesh SST generated in operation 375. In more detail, the terminal B 130 may estimate a time to receive the traffic information based on the mesh SST'. Also, the terminal B 130 may receive the traffic information transmitted in the estimated time.

Figure 4:
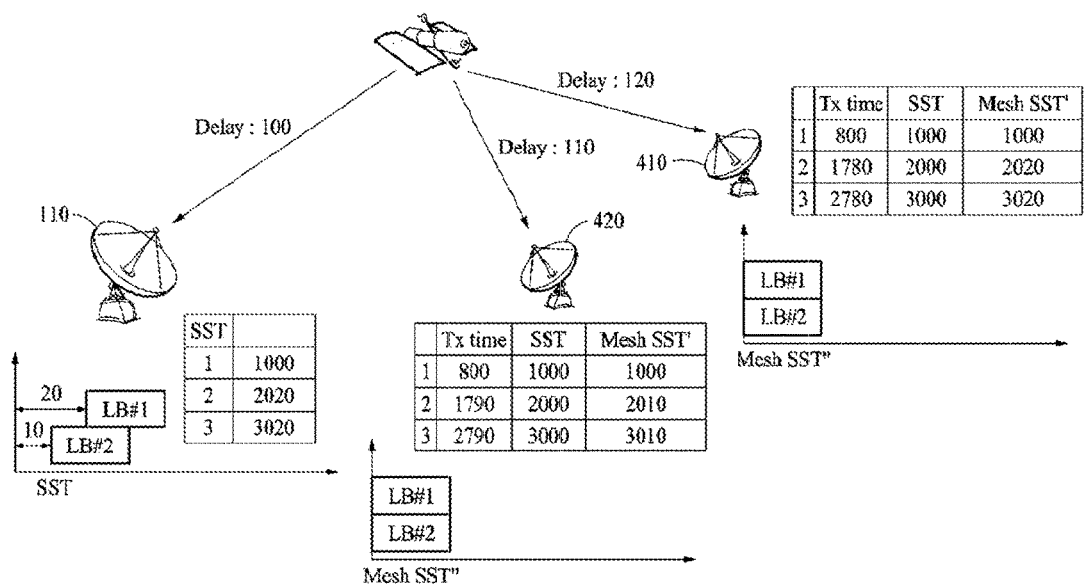
FIG. 4 illustrates a network synchronization process of a time division multiple access (TDMA)-based mesh network satellite communication system according to an example embodiment.

FIG. 4 illustrates a network synchronization process of a time division multiple access (TDMA)-based mesh network satellite communication system according to an example embodiment.

Each of a terminal A 410 and a terminal B 420 may generate a superframe start time (SST) 1000 using forward link signaling (FLS) information received from the central station 110.

In addition, each of the terminal A 410 and the terminal B 420 may transmit a log-on burst (LB) signal to the central station 110 when a Tx time corresponds to 800 based on a transmission delay 200. Here, the transmission delay 200 indicates a delay value determined by estimating that a transmission delay between a satellite, the terminal A 410, and the terminal B 420 corresponds to 100 because a transmission delay between the central station 110 and the satellite corresponds to 100.

Here, because the transmission delay between the terminal A 410 and the satellite corresponds to 120, the central station 110 may receive the LB signal from the terminal A 410 in a time corresponding to 1020. The central station 110 may verify a difference, −20, between an estimated time corresponding to 1000 to receive the LB signal from the terminal A 410 and a time corresponding to 1020 in which the LB signal is actually received, as timing error information between the terminal A 410 and the central station 110.

Thus, the central station 110 may transmit the timing error information and the LB signal to the terminal A 410 in a time corresponding to 1780 by reflecting the timing error information to allow the terminal A 410 to receive the LB signal in an SST 2000.

Here, the terminal A 410 may receive the timing error information in addition to the LB signal. The terminal A 410 may determine a mesh SST' as 2020 by adding +20 obtained by reversing a sign of the timing error information, −20, to an SST.

The terminal A 410 transmits the LB signal to the terminal B 420 in a time corresponding to 1780 based on the timing error information.

Because the transmission delay between the terminal B 420 and the satellite corresponds to 110, the central station 110 may receive the LB signal from the terminal B 420 in a time corresponding to 1010. The central station 110 may verify that a difference, −10, between an estimated time corresponding to 1000 to receive the LB signal from the terminal B 420 and a time corresponding to 1010 in which the LB signal is actually received, as timing error information between the terminal A 420 and the central station 110.

Thus, the central station 110 may transmit the LB signal and the timing error information to the terminal B 420 in a time corresponding to 1790 by reflecting the timing error information to allow the terminal B 420 to receive the LB signal in the SST 2000.

The terminal B 420 may receive the timing error information in addition to the LB signal. The terminal B 420 may determine the mesh SST' as 2010 by adding +10 obtained by reversing the sign of the timing error information, −10, to the SST.

When the terminal A 410 corresponds to 1780, the LB signal transmitted to the terminal B 420 may arrive at the terminal B 420 in a time corresponding to 2010 based on a transmission delay 110 between the terminal B 420 and the satellite and a transmission delay 120 between the terminal A 410 and the satellite.

That is, the terminal B 420 receives the LB signal in a time corresponding to the mesh SST' such that the LB signal transmitted by the terminal A 410 may be synchronized and received without a delay.

The present disclosure may provide a network synchronization between terminals without an auxiliary device, for example, a global positioning system (GPS) because a terminal B generates a mesh SST' by reversing a sign of timing error information and receives traffic information transmitted by a transmission terminal using the mesh SST' to set a reception time based on an increased transmission delay even when the transmission delay increases due to an increase in a distance between terminals.

The components described in the exemplary embodiments of the present invention may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the exemplary embodiments of the present invention may be achieved by software, and the software may be recorded on a recording medium. The components, the functions, and the processes described in the exemplary embodiments of the present invention may be achieved by a combination of hardware and software.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A synchronization method of a mesh network satellite communication system, the method comprising:
   receiving timing error information from a central station;
   generating a mesh superframe start time (SST') by reversing a sign of the timing error information; and
   receiving traffic information transmitted by a transmission terminal using the mesh SST'.

2. The method of claim 1, further comprising:
   receiving forward link signaling (FLS) information and transmission delay information from the central station;
   generating an SST based on configuration information on each of bursts, a frame, and a superframe included in the received FLS information; and
   transmitting a log-on burst (LB) signal to the central station in a transmission time determined based on the SST and the transmission delay information,
   wherein the timing error information is calculated using the LB signal in the central station.

3. The method of claim 1, wherein the generating of the mesh SST' comprises generating the mesh SST' by adding a transmission delay difference included in the timing error information to an SST.

4. The method of claim 1, wherein the traffic information is transmitted from the transmission terminal in a transmission time determined based on an SST and the timing error information received from the central station by the transmission terminal.

5. A mesh network satellite communication system, the system comprising:
   a terminal B configured to receive timing error information from a central station, generate a mesh superframe start time (SST') by reversing a sign of the timing error information, and receive traffic information transmitted by a transmission terminal using the mesh SST'.

6. The system of claim 5, wherein the terminal B is configured to receive forward link signaling (FLS) information and transmission delay information from the central station, generate an SST based on configuration information on each of bursts, a frame, and a superframe included in the received FLS information, and transmit a log-on burst (LB) signal to the central station in a transmission time determined based on the SST and the transmission delay information, and
   the timing error information is calculated using the LB signal in the central station.

7. The system of claim 5, wherein the terminal B is configured to generate the mesh SST' by adding a transmission delay difference of the terminal B included in the timing error information to an SST.

8. The system of claim 5, wherein the traffic information is transmitted from the transmission terminal in a transmission time determined based on an SST and the timing error information received from the central station by the transmission terminal.

* * * * *